United States Patent
Sorin

(10) Patent No.: US 8,727,274 B2
(45) Date of Patent: May 20, 2014

(54) METHOD OF MANAGING A GROUND CONNECTION OF AN AIRCRAFT

(75) Inventor: Anthony Sorin, Versailles (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 575 days.

(21) Appl. No.: 13/089,811

(22) Filed: Apr. 19, 2011

(65) Prior Publication Data

US 2011/0266388 A1 Nov. 3, 2011

(30) Foreign Application Priority Data

Apr. 28, 2010 (FR) ...................................... 10 53260

(51) Int. Cl.
*B64C 25/22* (2006.01)

(52) U.S. Cl.
USPC .......................... 244/104 FP; 244/111; 244/50

(58) Field of Classification Search
USPC .............. 244/1, 100 R, 102 SS, 103 R, 104 R, 244/104 FP, 110 R, 110 A, 111, 50
See application file for complete search history.

(56) References Cited

U.S. PATENT DOCUMENTS

| | | | | |
|---|---|---|---|---|
| 2,814,482 A | * | 11/1957 | Anderson et al. | 267/64.11 |
| 3,696,894 A | * | 10/1972 | Brady et al. | 188/275 |
| 4,004,762 A | * | 1/1977 | Jenkins | 244/104 FP |
| 4,061,295 A | * | 12/1977 | Somm | 244/104 FP |
| 4,273,303 A | * | 6/1981 | Somm | 244/104 FP |
| 4,381,857 A | * | 5/1983 | Cook | 267/64.15 |
| 4,702,438 A | * | 10/1987 | Levy et al. | 244/104 FP |
| 4,869,444 A | * | 9/1989 | Ralph | 244/104 FP |
| 6,120,009 A | * | 9/2000 | Gatehouse et al. | 267/64.11 |
| 6,220,676 B1 | * | 4/2001 | Rudd, III | 303/150 |
| 6,345,564 B1 | * | 2/2002 | Kilner et al. | 91/169 |
| 6,676,076 B1 | * | 1/2004 | Davies | 244/102 R |
| 7,942,366 B2 | * | 5/2011 | Waide | 244/102 SS |
| 7,967,244 B2 | * | 6/2011 | Long et al. | 244/100 R |
| 8,180,504 B1 | * | 5/2012 | Nance | 701/5 |
| 8,276,843 B2 | * | 10/2012 | Wilby | 244/102 SS |
| 8,317,131 B2 | * | 11/2012 | Regis et al. | 244/111 |
| 8,340,892 B2 | * | 12/2012 | Long et al. | 701/124 |
| 2005/0006524 A1 | * | 1/2005 | Villaume et al. | 244/111 |
| 2005/0224642 A1 | | 10/2005 | Sullivan | |
| 2007/0221783 A1 | * | 9/2007 | Parks et al. | 244/102 A |

(Continued)

FOREIGN PATENT DOCUMENTS

FR 2935680 A1 3/2010

OTHER PUBLICATIONS

French Search Report for corresponding French Application No. 10 53260 dated Jan. 12, 2011.

*Primary Examiner* — Benjamin P Lee
(74) *Attorney, Agent, or Firm* — Sughrue Mion, PLLC

(57) ABSTRACT

A method of managing a ground connection of an aircraft having landing gear with wheels that are subjected to static loads, some of which wheels are fitted with respective braking devices and others are fitted with respective independent drive devices, the method including the step of causing a modification to a distribution of the static loading to which the wheels of the landing gear are subjected in such a manner as to:
increase the loading on at least some wheels fitted with respective braking devices, during a braking stage; and
increase the loading on at least some wheels fitted with respective independent drive devices, during an independent drive stage.

4 Claims, 1 Drawing Sheet

(56) References Cited

U.S. PATENT DOCUMENTS

| | | | |
|---|---|---|---|
| 2008/0119967 A1* | 5/2008 | Long et al. | 701/3 |
| 2008/0201025 A1* | 8/2008 | Dellac et al. | 701/3 |
| 2009/0065635 A1* | 3/2009 | Regis et al. | 244/81 |
| 2009/0065640 A1* | 3/2009 | Regis et al. | 244/111 |
| 2009/0210126 A1* | 8/2009 | Dellac et al. | 701/70 |
| 2009/0218440 A1 | 9/2009 | Dilmaghani et al. | |
| 2010/0116931 A1 | 5/2010 | Wilby | |
| 2011/0089289 A1* | 4/2011 | Wilson | 244/50 |

* cited by examiner

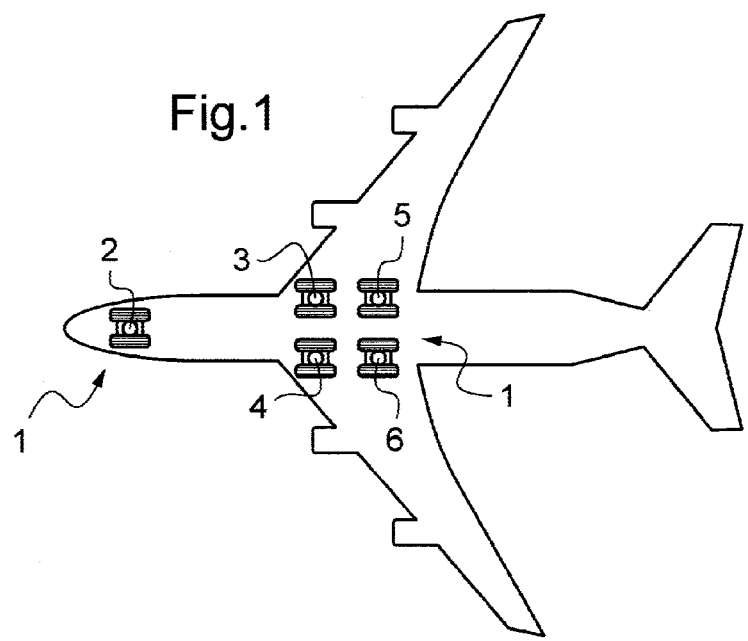
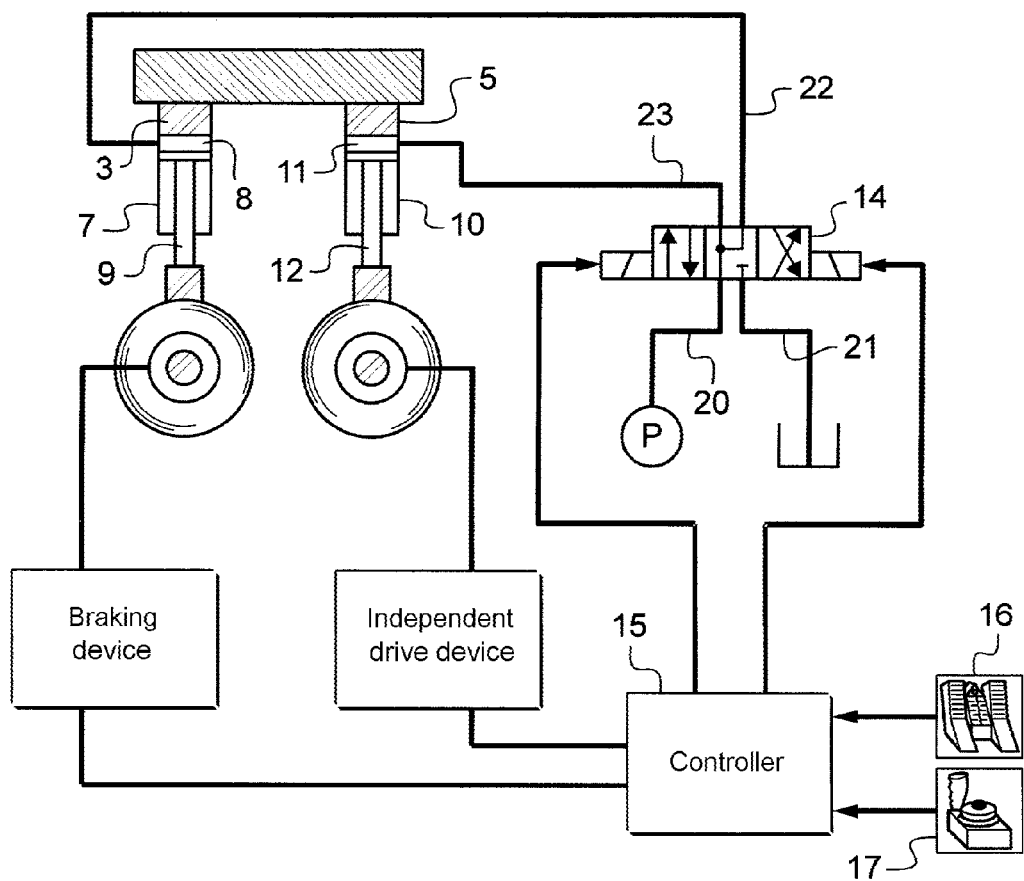

METHOD OF MANAGING A GROUND CONNECTION OF AN AIRCRAFT

The invention relates to a method of managing a ground connection of an aircraft.

It should be recalled that when an aircraft is on the ground, all of the wheels of the landing gear of the aircraft are subjected to static loads. It should also be recalled that during a stage in which the aircraft is braking, the braking force that can be developed by a wheel fitted with a braking device at its ground interface is substantially proportional to the static load to which that wheel is subjected. Similarly, during a stage in which the aircraft is under independent drive, the force that can be developed by a wheel fitted with an independent drive device at its ground interface is substantially proportional to the static load to which that wheel is subjected.

It should be recalled that an aircraft has landing gear made up of a plurality of undercarriages for the purpose of providing an interface between the aircraft and the ground.

TECHNOLOGICAL BACKGROUND OF THE INVENTION

It is known to fit a wheel of landing gear with a braking device. It is also known to fit a wheel of landing gear with an independent drive device mainly comprising an electric motor so as to be capable of moving the aircraft on the ground without assistance from its thrusters.

Such devices are found to be bulky, which makes it difficult to fit a given wheel both with a braking device and with an independent drive device. Proposals have thus been made to fit some of the wheels on a given undercarriage with braking devices and other wheels with independent drive devices.

Nevertheless, that arrangement reduces the braking capacity of the aircraft compared with an arrangement in which all of the wheels are fitted with braking devices only.

Similarly, that arrangement presents reduced capacity for independent drive of the aircraft, since not all of the wheels are fitted with independent drive devices.

That drawback is made worse when the state of the ground leads to reduced coefficients of friction, e.g. in the event of rain or ice.

OBJECT OF THE INVENTION

An object of the invention is to propose a method of managing a ground connection of an aircraft for the purpose of improving the braking capacity and the independent drive capacity of an aircraft fitted with both types of device.

BRIEF DESCRIPTION OF THE INVENTION

In order to achieve this object, there is provided a method of managing a ground connection of an aircraft having landing gear with wheels that are subjected to static loads, some of which wheels are fitted with respective braking devices and others are fitted with respective independent drive devices.

According to the invention, the method comprises the step of causing a modification to a distribution of the static loading to which the wheels of the landing gear are subjected in such a manner as to:

increase the loading on at least some wheels fitted with respective braking devices, during a braking stage; and increase the loading on at least some wheels fitted with respective independent drive devices, during an independent drive stage.

Thus, during a braking stage, the static load is increased on each wheel that is fitted with a braking device, such that the braking force that can be developed by each of those wheels is likewise increased. The braking capacity of the aircraft is thus increased.

Symmetrically, during a stage of independent drive, the static load is increased on each wheel that is fitted with an independent drive device, such that the traction force that can be developed by each of those wheels likewise increases. The independent drive capacity of the aircraft is thus increased.

BRIEF DESCRIPTION OF THE DRAWING

The invention can be better understood in the light of the following description of a particular, non-limiting embodiment of the invention given with reference to the figures of the accompanying drawing, in which:

FIG. 1 is a diagrammatic view from beneath of an aircraft fitted with landing gear implementing the method of the invention; and FIG. 2 is a diagram of two main undercarriages of the FIG. 1 landing gear.

DETAILED DESCRIPTION OF THE INVENTION

As shown in FIG. 1, the method of the invention is described herein in detail with reference to an aircraft comprising landing gear 1 in the form of a nose undercarriage 2 at the front of the aircraft, front main undercarriages 3 and 4 located respectively on the left and the right of the fuselage, and rear main undercarriages 5 and 6 located respectively on the left and the right of the fuselage. In this example, each undercarriage has two wheels. All of the wheels are subjected to static loads when the aircraft is on the ground, with the static loads being shared between the wheels as a function of the stiffnesses of the undercarriages carrying said wheels and also as a function of the position of the center of gravity of the aircraft.

The group of front main undercarriages 3, 4 carries wheels that are fitted with braking devices, and the group of rear main undercarriages 5, 6 carries wheels that are fitted with independent drive devices. The braking devices and the independent drive devices are well known in the prior art and they are not described in greater detail herein.

During braking, a fraction of the static loading is naturally transferred towards the front of the aircraft: the static loading increases a little on each of the wheels of the front main undercarriages 3, 4 that are fitted with braking devices, such that the braking force that can be developed by each of the wheels also increases. The braking capacity of the aircraft is thus increased a little. According to the invention, this natural modification of static loading is enhanced even further by giving rise to a change in the distribution of static loading in addition to that modification that is due to the braking on its own, with the modification tending to increase the loading on the wheels of the front main undercarriages 3, 4, during a braking stage.

In a manner identical to a braking stage, a fraction of the static loading is naturally transferred towards the rear or the front of the aircraft during a stage of independent drive, depending on whether that involves a stage of acceleration or of deceleration. Since only the wheels of the rear main undercarriages 5, 6 are fitted with independent drive devices, the natural distribution of static loading can thus be slightly favorable or slightly unfavorable for the ability of the aircraft to move independently. According to the invention, the natural modification of the static loading is further enhanced, at least when the wheels of the rear main undercarriages 5, 6 are being used for accelerating the aircraft, by causing the distribution of static loading to be modified beyond the modification due to independent drive, and tending to increase the loading on the wheels of the rear main undercarriages 5, 6 regardless of the stage of their independent drive.

As shown in FIG. 2, the left front main undercarriage 3 includes a shock absorber comprising a cylinder 7 in which a piston-forming slide rod 9 is mounted to slide and to co-operate with the cylinder 7 to define an oil chamber 8. Identically, the left rear main undercarriage 5 includes a shock absorber comprising a cylinder 10 in which a piston-forming slide rod 12 is mounted to slide and to co-operate with the cylinder 10 to define an oil chamber 11. The right front main undercarriage 4 and the right rear main undercarriage 6 likewise have respective shock absorbers identical to those of the left front and rear main undercarriages 3 and 5. The slide rods of the dampers in the main undercarriages 3, 4, 5, and 6 carry the axles that carry the wheels of the undercarriages.

In the invention, the aircraft is fitted with a device for modifying the static loading, which device is constituted in this example by a 4-port/3-position slide valve 14 having two inlet ports 20 and 21 connected respectively to a source of pressure and to a return, and two outlet ports 22 and 23 connected respectively to the chambers 8 and 11 of the left front and rear main undercarriages 3 and 5.

In the neutral position as shown, both outlet ports 22 and 23 are connected to the pressure source.

In the braking position (right position), the slide valve 14 puts the first outlet port 22 into communication with the first inlet port 20, and the second outlet port 23 into communication with the second inlet port 21 so that the chamber 8 of the left front main undercarriage is connected to the source of pressure while the chamber 5 of the left rear main undercarriage is connected to the return.

In the independent drive position (left position), the side valve 14 puts the first outlet port 22 into communication with the second inlet port 21 and the second outlet port 23 into communication with the first inlet port 20, such that the chamber 8 of the left front main undercarriage is connected to the return and the chamber 5 of the left rear main undercarriage is connected to the source of pressure.

The device for modifying static load also includes a controller 15 for controlling the slide valve 14 and for placing it selectively in one or another of its positions.

When a braking order is given, e.g. by means of brake pedals 16, the controller 15 detects that order and moves the slide valve 14 to its braking position, such that oil can be expelled from the left rear main undercarriage 5 towards the return, thereby having the effect of making it less stiff than the left front main undercarriage 3. The static load carried by the left rear main undercarriage 5 is thus decreased, thereby having the effect of adding load to the left front main undercarriage 3. This increases the capacity of the braking device.

In the same manner, when an order is given for independent drive, e.g. by means of taxiing control sticks 17, the controller 15 detects the order and moves the slide valve 14 into its independent drive position, such that oil can be expelled from the left front main undercarriage 3 towards the return, thereby having the effect of making it less stiff than the left rear main undercarriage 5. The static load carried by the left front main undercarriage 3 is thus decreased, thereby having the effect of adding load to the left rear main undercarriage 5. The drive capacity of the independent drive device is thus increased.

The aircraft includes a second device for modifying static loading for the front and rear right main undercarriages 4 and 6. The second device is identical to the first device for modifying static loading on the left front and rear main undercarriages 3 and 5 and it operates simultaneously with the first device.

Naturally, the invention is not limited to the embodiment described and it may be subjected to embodiment variations without going beyond the ambit of the invention as defined by the claims.

In particular, although it is stated that the landing gear 1 has a nose undercarriage at the front and four main undercarriages 3, 4, 5, and 6 aligned in pairs on either side of the fuselage, the landing gear could naturally have any other configuration, such as for example one undercarriage at the front and two main fuselage undercarriages fitted with respective independent drive devices and two main wing undercarriages fitted with brakes. In addition, the landing gear 1 may include any other number of undercarriages and each undercarriage may have any other number of wheels.

Although the wheels of the left front main undercarriage 3 and of the left rear main undercarriage 5 are unloaded by a single device for modifying static loading, provisions could be made to unload the wheels of the first left front main undercarriage 3 and of the first left rear main undercarriage 5 by means of a device for modifying static loading that has as many slide valves as there are main undercarriages.

Although it is stated that the modification to the distribution of static load is performed by modifying the stiffnesses of the main undercarriages 3, 4, 5, and 6, by modifying the pressure in the shock absorbers of the main undercarriages 3, 4, 5, and 6, it is possible to use other means for achieving this modification of stiffness, such as in particular using the kneeling devices of the front and rear main undercarriages, if they are so equipped. The wheels of the front main undercarriages or the wheels of the rear main undercarriages are thus given extra loading by acting on the kneeling devices of the front main undercarriages or of the rear main undercarriages. It is also possible to vary the pressure of the air in the shock absorbers, or indeed to selectively deflate the tires of the wheels.

What is claimed is:

1. A method of managing a ground connection and improving the braking capacity of an aircraft having landing gear with wheels that are subjected to static loads, some of which wheels are fitted with respective braking devices and others are fitted with respective independent drive devices, wherein the method comprises:
   causing a modification to a distribution of the static loading to which the wheels of the landing gear are subjected in such a manner as to:
   increase the loading on at least some wheels fitted with respective braking devices, during braking stages; and
   increase the loading on at least some wheels fitted with respective independent drive devices, during independent drive stages.

2. A method according to claim 1, applied to an aircraft in which the wheels fitted with braking devices are carried by a first group of undercarriages while the wheels fitted with independent drive devices are carried by a second group of undercarriages, wherein extra loading is applied to the wheels of one or the other of the groups of undercarriages by modifying at least one operating parameter of the shock absorbers of the undercarriages of at least one of the groups of undercarriages.

3. A method according to claim 2, wherein, during braking stages, at least one functional parameter of the shock absorbers of the group of undercarriages having wheels that are fitted with independent drive devices is modified in order to reduce a stiffness of said shock absorbers, whereas during independent drive stages, at least one operating parameter of the shock absorbers of the group of undercarriages having wheels fitted with braking devices is modified in order to reduce a stiffness of said shock absorbers.

4. A method according to claim 1, applied to an aircraft where the wheels fitted with braking devices are carried by a first group of undercarriages while the wheels fitted with independent drive devices are carried by a second group of undercarriages, wherein the undercarriages of both groups include kneeling devices, and wherein extra loading is applied to the wheels of one or the other of the groups of undercarriages by operating the kneeling devices of the undercarriages of at least one of the groups of undercarriages.

* * * * *